(12) United States Patent
Valbuena

(10) Patent No.: US 10,454,843 B2
(45) Date of Patent: Oct. 22, 2019

(54) EXTENSIBLE MECHANISMS FOR WORKLOAD SHAPING AND ANOMALY MITIGATION

(71) Applicant: salesforce.com, inc., San Francisco, CA (US)

(72) Inventor: Fabio Meireles Valbuena, Alpharetta, GA (US)

(73) Assignee: salesforce.com, inc., San Francisco, CA (US)

(*) Notice: Subject to any disclaimer, the term of this patent is extended or adjusted under 35 U.S.C. 154(b) by 32 days.

(21) Appl. No.: 14/509,694

(22) Filed: Oct. 8, 2014

(65) Prior Publication Data

US 2015/0100698 A1 Apr. 9, 2015

Related U.S. Application Data

(60) Provisional application No. 61/888,788, filed on Oct. 9, 2013.

(51) Int. Cl.
*H04L 12/917* (2013.01)
*H04L 12/24* (2006.01)

(52) U.S. Cl.
CPC .......... *H04L 47/76* (2013.01); *H04L 41/5051* (2013.01)

(58) Field of Classification Search
CPC ............................ H04L 47/76; H04L 41/0883
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Philip J Chea
*Assistant Examiner* — Robert B McAdams
(74) *Attorney, Agent, or Firm* — Jaffery, Watson, Mendonsa & Hamilton, LLP

(57) ABSTRACT

Techniques and mechanisms for servicing requests for utilization of resources within a computing environment. A request is received from a remote electronic computing device with a regulator agent. The regulator functions to determine whether to regulate a request or to allow the request to be delivered without regulation. Regulating the request includes causing the request to be rejected, re-routed, isolated or delayed. Selectively regulating the request with the regulator based at least on application-level resources to be utilized by the application server in response to the request. Sending the request to a regulation server or to a computing device to provide an application server communicatively coupled with the regulator server depending on the regulation to be performed, if any.

25 Claims, 4 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,206,805 B1* | 4/2007 | McLaughlin, Jr. ..... G06F 9/466 707/999.01 |
| 7,340,411 B2 | 3/2008 | Cook |
| 7,620,655 B2 | 11/2009 | Larsson et al. |
| 9,244,958 B1* | 1/2016 | MacCanti ......... G06F 17/30578 |
| 9,292,348 B2* | 3/2016 | Adams ................. G06F 9/5077 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0236757 A1* | 11/2004 | Caccavale ......... G06F 11/3409 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0276238 A1* | 11/2008 | Levanoni ............. G06F 9/5083 718/100 |
| 2012/0054765 A1* | 3/2012 | Lee ...................... G06F 9/5027 718/104 |
| 2014/0325524 A1* | 10/2014 | Zangaro .............. G06F 9/5083 718/105 |

\* cited by examiner

EXTENSIBLE MECHANISMS FOR WORKLOAD SHAPING AND ANOMALY MITIGATION

PRIORITY AND RELATED APPLICATION DATA

This application claims priority to Provisional U.S. patent application Ser. No. 61/888,788, filed on Oct. 9, 2013, entitled "Extensible Mechanism for Workload Shaping," by Fabio Valbuena, which is incorporated herein by reference in its entirety and for all purposes.

TECHNICAL FIELD

Embodiments relate to workload shaping and anomaly mitigation. More particularly, embodiments relate to techniques for dynamically workload management and anomaly mitigation in environments in which incoming requests can be inconsistent over time.

BACKGROUND

Subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Web applications in a multi tenant environment can share a multitude of resources. This approach works really well most of the time when the aggregate workload is within the planned/expected capacity envelope. However, at times, it is possible that a given actor (e.g., organization, user, service, tenant) or user may perform unusual workload/spikes that can affect other users consuming the same shared resources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
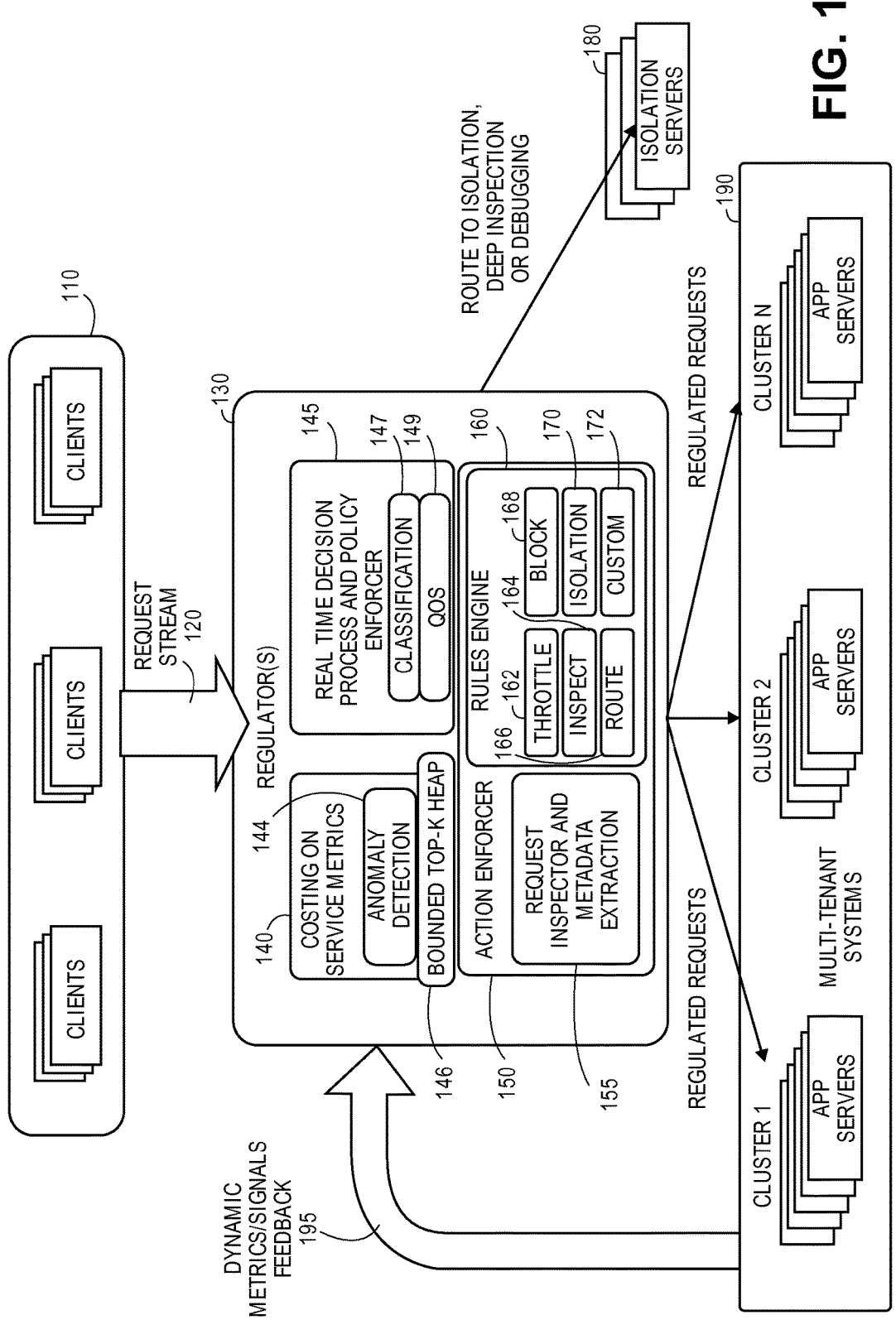
FIG. 1 is a conceptual diagram of a system that can provide workload shaping.

In the following description, numerous specific details are set forth. However, embodiments of the invention may be practiced without these specific details. In other instances, well-known circuits, structures and techniques have not been shown in detail in order not to obscure the understanding of this description.

Embodiments described herein can be utilized to address workload shaping issues (including anomalies) by providing a workload regulator at the 'edge' of a system/environment that receives requests from external devices. The system (or environment) can be, for example, a group of servers providing services such as an on-demand services environment (e.g., multitenant database, software as a service (SaaS), messaging services, content management).

In one embodiment, the regulator can run on each of the application servers independently and may coordinate among themselves on as needed basis. Requests arriving on the system can be regulated using a variety and extensible set of actions. Requests can be accepted, rejected, re-routed, isolated, inspected, and/or delayed by a variety of strategies such as enqueueing and dispatching at a predetermined rate, enqueuing and dispatching maintaining a predetermined number of concurrent requests, enqueuing and dispatched based on resources availability and quality of service policies, etc.

In one embodiment, the regulator receives requests and determines, automatically in real-time, which requests to act on and what handling strategy to use. In one embodiment, this regulation behavior is determined by a set of one or more rules. In one embodiment, rules are essentially a filter and an action. The Filter determines what class of request attributes and features to select among all incoming request and the action determines what handling behavior is desired on the requests that satisfies the filter predicates.

In one embodiment, the filter can be any information derived from the web request, for example, the user, the originating customer institution, the target Universal Resource Indicator (URI) pattern, target resources such as databases, indexes, cache locality, etc. In one embodiment, actions are extensible and new actions can be created and added to the system. Example actions include: defer execution according to different strategies, reject the request, profile the request to better understand the use of certain resources, route to different cluster of servers or single servers based on a variety of strategies such as closeness to the required resources: data, caches, route to isolation server clusters, trace, custom scripts, etc.

In one embodiment, the mechanisms described herein behave seamlessly with respect to the downstream application. From the application perspective, regulated requests are no different from non-regulated requests. That makes the application development simpler.

In one embodiment, the mechanism uses real-time and historic metrics from a variety of resource classes to identify and classify usage patterns and infer adequate automatic actions. This allows for a proactive protection action allowing operations teams time to engage and identify the proper actions.

In one embodiment, the framework is extensible and new rules can be added to the system to support new behaviors. Also, rules can use other kinds of information to decide how to handle a given class of requests. For instance, different software license agreement (SLA) levels or contract rates (e.g., paying customer vs. free customers) may be handled differently to conform to a desirable serving policy.

In one embodiment, mechanisms described herein differ from traditional load balancing in that a load balancer focuses primarily at the network level and does not 'understand' the request at the application level, the dynamic and real-time resources being used by the system. In contrast, embodiments of the regulator can perform certain actions based on the specific organization, users, request performance traits, even the target data source or index, data source partition that the request needs.

Another difference is that load balancer does not dynamically seek to 'smooth' out spikes and resource constraints—it distributes it. The load balancer is also not adaptive to the system resources. The load balancer does not address the problem of anomaly detection—being resource induced or potentially malicious such as DOS attacks with the understanding of the resources topology and capacity. Embodiments of the regulators can function to grab spikes for a given organization/customer/user, dbnode, partition and put in a queue and pull them for execution at a controlled rate, identify requests that consume too much of resource class and route them to a dedicated cluster (or server) for isolation, investigation, block malicious fake logins, etc.

In one embodiment, operation of the regulator(s) can be based on the five rule types (block, throttle, trace, null, route), but the mechanism is extensible to other rule behaviors (profiling, notification, etc.).

FIG. 1 is a conceptual diagram of a system that can provide workload shaping. Client device(s) 110 represent any number of client electronic devices that can be used to request information from one or more application servers that are part of the system/environment responding to requests from the client electronic devices. Client device(s) 110 can be, for example, desktop computer systems, laptop computer systems, tablet devices, smartphones, kiosks, wearable computing devices, automobiles, thin computing devices, etc. Requests can also be received from other services, for example, as integration tasks executed by other services and/or institutions. While the examples and description discuss requests that are regulated in some manner, many (possibly most) requests pass through regulating elements without of the regulating functionality described herein.

Client device(s) 110 generate requests to the application servers, which are represented by request stream 120. The requests can be any type of requests directed to the application servers. In one embodiment, all requests from request stream 120 are received by one or more regulators 130. In one embodiment each application server can have a corresponding regulator. In other embodiments, application servers can share regulators or multiple regulators can be assigned to one or more application servers.

Regulator 130 provides the functionality discussed above. In one embodiment, regulator 130 includes costing on service metrics agent 140 that can operate to provide cost analysis for requests from request stream 120. Costing agent 140 can function to analyze resources required (and/or other costs) for servicing the request as part of analysis to determine how the corresponding request is to be handled.

In one embodiment, costing agent 140 can also include anomaly detector 144 that can operate to identify anomalous requests in request stream 120. Depending on the anomaly detected, regulator 130 can take different actions to respond to the anomaly. In one embodiment, costing agent 140 utilizes bounded Top-K heap 146 to perform costing analysis. Bounded Top-K heap 146 can provide, for example, lowest-cost or best-case allocations or other resource cost information related to incoming requests. In one embodiment, costing agent 140 provides results and/or analytical information to action enforcer 150 that initiates the action to be performed for a request.

In one embodiment, costing agent 140 analyzes historical data (e.g., number of requests over a period of time, amount of memory required to service concurrent requests, computational resources required for reports) to determine the resource costs for one or more requests. In an on-demand or multi-tenant environment, cost and/or historical information can be gathered and applied for individual customers/organizations/tenants/etc. Further information may be gathered with respect to the sources of the requests, for example, which users, geographic locations and/or other information. Thus, costing agent 140 aggregates various resource costs that can be used for decision making when scheduling/routing/processing incoming requests.

In one embodiment, bounded Top-K heap 146 is utilized to rank incoming requests base on cost metrics and/or other information. Bounded Top-K heap 146 can be utilized to identify outliers and anomalies for anomaly detector 144. These components can be utilized to determine, for example, excessive use of a resource by one or more client devices 110 or organizations.

In one embodiment, decision process and policy enforcer agent 145 applies policies to the requests. As discussed above, the policies may be based on one or more sets of rules. In one embodiment, policy enforcer agent 145 utilizes classification module 147 that provides classification rules and information, and quality of service (QoS) module 149 that provides QoS rules and information. Policy enforcer agent 145 can use different and/or additional information to enforce policies as described herein. In one embodiment, policy enforcer agent 145 provides results and/or analytical information to action enforcer 150 that initiates the action to be performed for a request.

In one embodiment, decision process and policy enforcer agent 145 determines the action to be taken for each request, for example, throttling, blocking, sending related requests to the same application server, or isolating/quarantining the requests. Other actions can also be supported. In one embodiment, classification module 147 can group requests that are similar. The characteristics that are utilized for classification can be, for example, request type, resource required, source of request, QoS category, etc. QoS module 149 provides QoS enforcement mechanisms for the incoming requests.

In one embodiment, action enforcer 150 enforces action utilizing at least information from costing agent 140 and policy enforcer agent 145. Action enforcer 150 can also provide analysis and enforcement functionality independent of or in addition to information received from costing agent 140 and or policy enforcer agent 145. In one embodiment, action enforcer 150 includes request inspector and metadata extraction module 155 that can determine information related to the request, for example, the identity of the user making the request, the company (if any) associated with the user, the customer organization/tenant (if any) associated with the user, resources required by the request and/or other information. Action enforcer 150 can apply the rules described above to requests and cause the appropriate action to be taken.

In one embodiment, action enforcer 150 includes rules engine 160 that provides one or more sets of rules that are utilized to regulate incoming requests. Various rule types can be supported. A few examples are discussed above and six specific examples are provided in FIG. 1; however, different rule types and modules can also be supported. In one embodiment, throttle module 162 provides rules and functionality associated with throttling of requests by action enforcer 150. Throttle module 162 can provide rules and functionality for determining and flagging requests to be throttled.

Inspection module 164 can provide rules and functionality for inspecting requests. For example, inspection module 164 can provide rules about what requests to inspect, what type of inspection/analysis to perform, what results to provide, etc. Routing module 166 can provide rules and functionality related to routing of requests. For example routing module 166 can provide rules for when requests are to be routed differently and/or how the requests are to be routed. For example, requests can be routed to a specific application server or cluster of application servers.

Block module 168 can provide rules and functionality related to blocking a request. For example, if a request comes from a source that is not allowed to access resources, the request can be blocked. In one embodiment, blocked requests are routed to isolation servers 180. Isolation module 170 can provide rules and functionality related to isolation of requests. In one embodiment, one or more suspected pernicious requests can be routed to isolation servers 180 temporarily or permanently. Custom module 172 can provide rules and functionality related to utilization of resources based on, for example, physical closeness.

After requests are analyzed and/or processed by regulator 130, the requests that are not dropped or isolated are sent to one or more application servers 190 that can function to service the request. The application servers can be organized as clusters or otherwise grouped. In one embodiment, one or more application servers 190 can provide metric feedback information 195 to regulator(s) 130. The feedback information can be any type of information related to the resources and/or functionality of application servers 190 that can be used for regulation purposes. For example, application servers 190 can provide feedback information indication memory and/or processor usage over time, the number of requests processes, etc.

Application servers 190 provide any type of server resources. For example, application servers can provide an on-demand services environment to service one or more of client devices 110. For example, application servers 190 can provide a multitenant environment (e.g., database, logistics, customer service) that provides services to multiple organizations/customers/tenants while keeping data for the respective organizations/customers/tenants secure and separate. Embodiments of multitenant environments are described in greater detail below.

Figure 2:
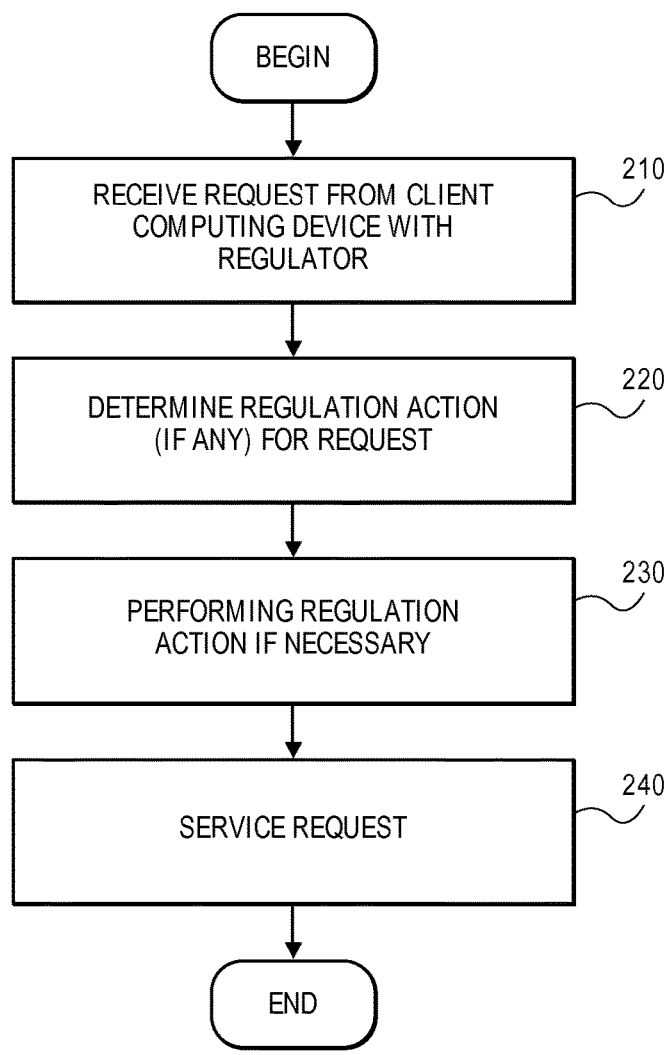
FIG. 2 is a flow diagram of one embodiment of a technique for providing workload shaping.

FIG. 2 is a flow diagram of one embodiment of a technique for providing workload shaping. In one embodiment, the regulator of FIG. 1 provides the functionality described in FIG. 2. In one embodiment, the regulator is at the "edge" of the receiving system. That is, the regulator receives or "intercepts" requests before the requests can be received/analyzed/processed by any of the system components.

With respect to a multitenant environment embodiment, web applications can share a multitude of resources. Under most conditions, the aggregate workload is within the planned/expected capacity envelope. However, at times, it is possible that a given organization or user may perform unusual workload/spikes that can affect other users consuming the same shared resources. The techniques described herein allow for management of the workload to respond to these spikes.

In one embodiment, the regulators run on each of the application servers of an on-demand or multi-tenant environment independently and the group of regulators can coordinate among themselves on as needed basis. Requests arriving on the system can be regulated using a variety and extensible set of actions. Requests can be accepted, rejected, re-routed, isolated, inspected, delayed by a variety of strategies such as enqueuing and dispatching at a predetermined rate, enqueuing and dispatching maintaining a predetermined number of concurrent requests, enqueuing and dispatched based on resources availability and quality of service policies, etc.

One or more requests are received with a regulator, 210. The requests are received from one or more client computing devices. The client computing devices can be, for example, laptop computers, tablets, smartphones, thin computing devices, desktop computers and/or wearable computing devices, etc. As discussed above, the regulator is conceptually on the edge of the receiving environment to intercept, or receive, the requests before the target server systems.

The regulator applies the rules, as discussed above, to determine if a regulation action is to be taken on a request, 220. In various embodiments, different rule sets can be applied to different requests based on, for example, source of the request, timing of the request, frequency of requests, etc. Global rule sets may also be applied. For example, in a multitenant environment, different tenants may have different rule sets applied.

In one embodiment, any information derived from the request can be utilized to determine the regulation action to be performed, for example, the user, the originating customer institution, the target Universal Resource Indicator (URI) pattern, target resources such as databases, indexes, cache locality, etc. In one embodiment, actions are extensible and new actions can be created and added to the system. Example actions include: defer execution according to different strategies, reject the request, profile the request to better understand the use of certain resources, route to different cluster of servers or single servers based on a variety of strategies such as closeness to the required resources: data, caches, route to isolation server clusters, trace, deep request inspection, custom scripts, etc.

The regulation action is performed, if necessary, 230. As discussed above, the regulation action can include, for example, requests can be accepted, rejected, re-routed, isolated, inspected, and/or delayed by a variety of strategies such as enqueuing and dispatching at a predetermined rate, enqueuing and dispatching maintaining a predetermined number of concurrent requests, enqueuing and dispatched based on resources availability and quality of service policies, etc.

Requests are serviced, 240. The request servicing can be performed by one or more application servers within the receiving environment. Requests that are not regulated are passed by the regulator(s) in the normal manner. Requests that are regulated (except for blocking and isolating) are processed by the application servers after regulation. The responses to the requests are sent back to the requesting client devices.

Figure 3:
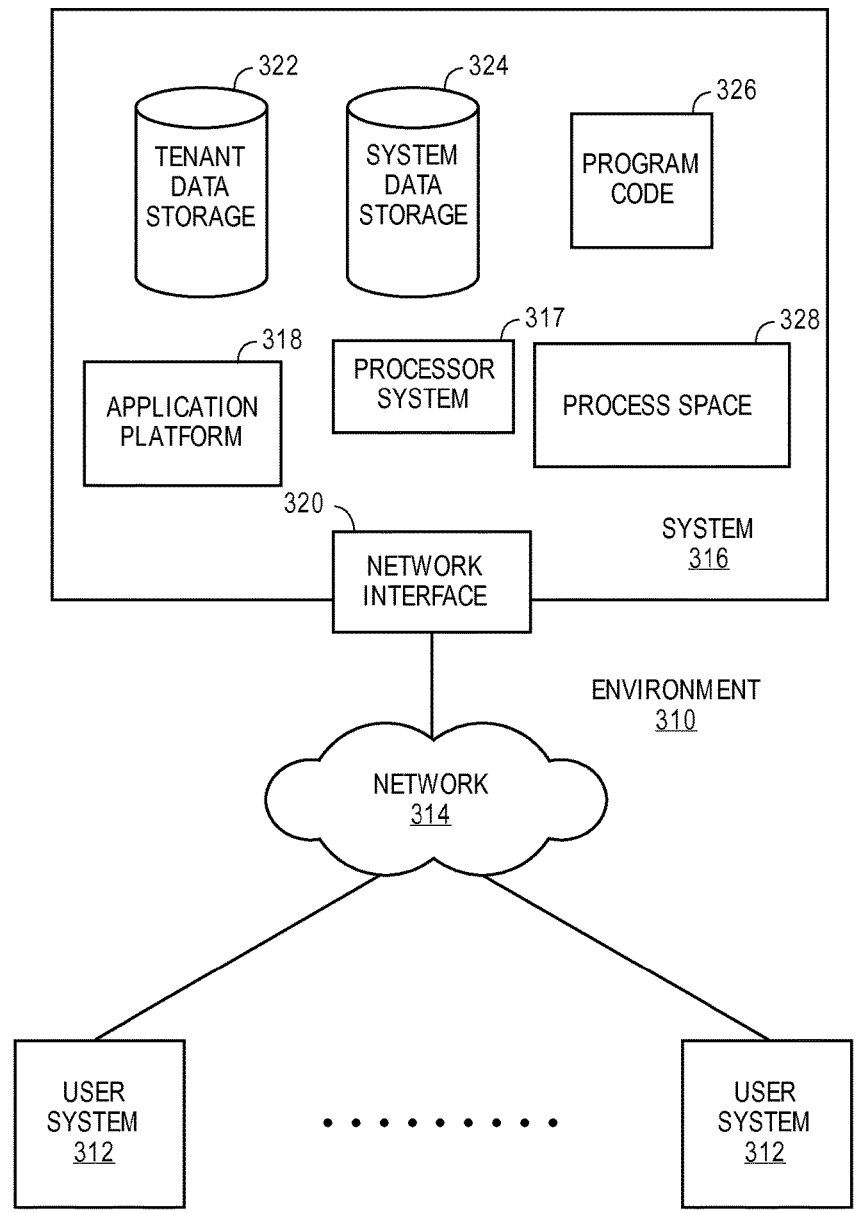
FIG. 3 is a block diagram of one environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
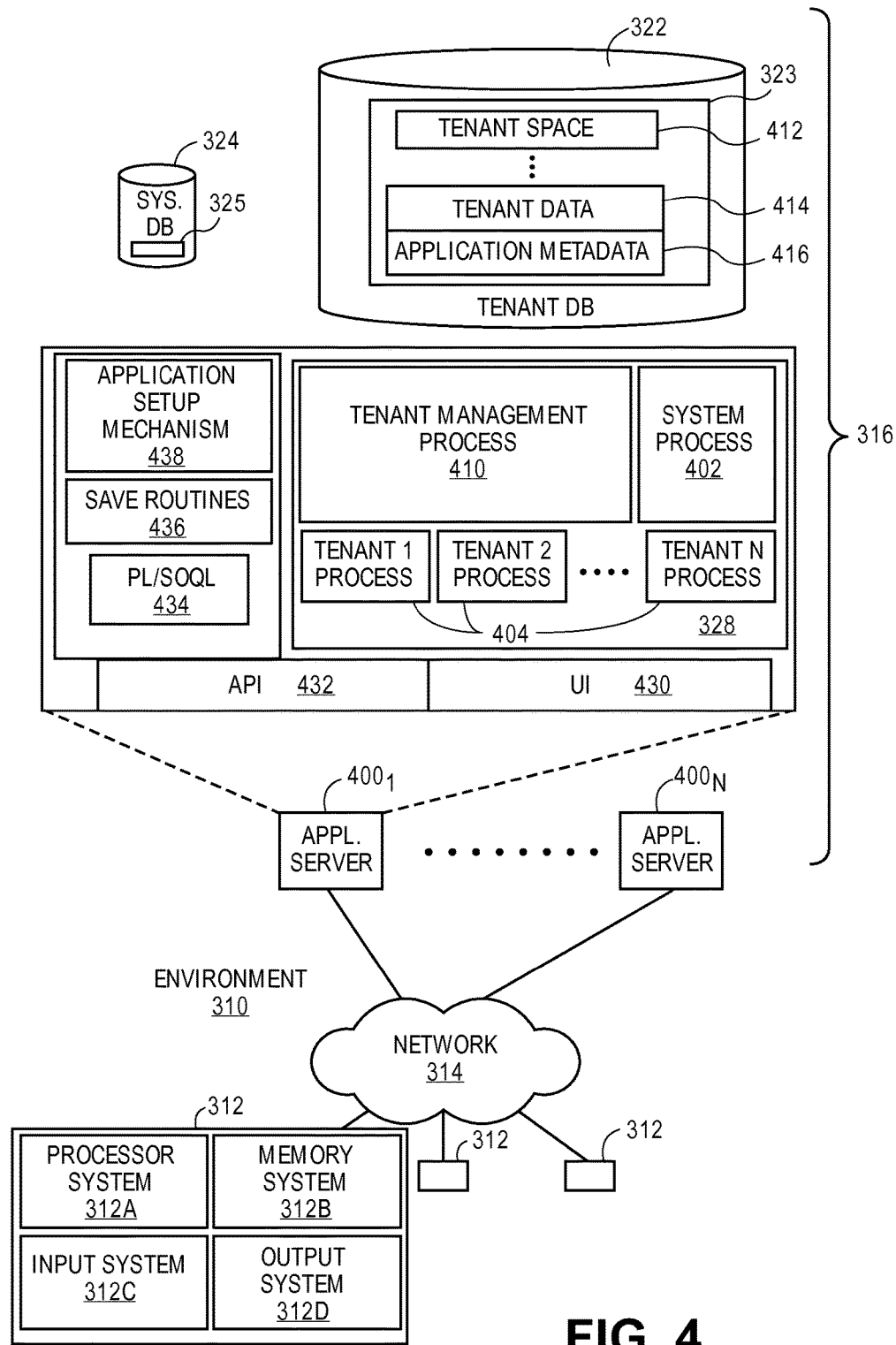
FIG. 4 is a block diagram of one embodiment of elements of environment of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage space 412, tenant data 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage spaces 412, which can be either a physical arrangement and/or a logical arrangement of data. Within each tenant storage space 412, tenant data 414 and application metadata 416 might be similarly allocated for each user. For example, a copy of a user's most recently used (MRU) items might be stored to tenant data 414. Similarly, a copy of MRU items for an entire organization that is a tenant might be stored to tenant storage space 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process space 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service" issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system for servicing requests for utilization of resources within a computing environment, the system comprising:
    a regulator to receive a request from a remote electronic computing device, the request to utilize resources of at least one computing device within the computing environment, the regulator to determine in real time and at an application level whether to regulate a request or to allow the request to be delivered without regulation, wherein regulating the request comprises causing the request to be one of rejected, re-routed, isolated and delayed based on at least one of a specific organization, user, request performance trait, and target node data source, wherein the regulator makes the determination at the application level based on a resource cost analysis and whether the request represents an anomaly with respect to requests in a request stream;
    a computing device to provide an application server communicatively coupled with the regulator, the computing device having resources to generate a response to the request and to cause the response to be transmitted to the remote electronic computing device;
    wherein the regulator selectively regulates the request in real time based on application-level resources to be utilized by the application server in response to the request by analyzing the request prior to delivery to the application server, wherein the selective regulation at least routes requests to consume excessive portions of a resource class to a queue for subsequent service at a controlled rate, wherein the selective regulation further comprises filtering to select among incoming requests and an action that determines a handling behavior based on the requests that satisfies the filter predicates;
    wherein the regulator receives application-level feedback information from one or more application servers configured to process requests to modify subsequent request filtering based, at least in part, on the application-level feedback information.

2. The system of claim 1 where re-routing the request comprises enqueuing one or more requests and dispatching requests at a pre-selected rate.

3. The system of claim 1 where re-routing the request comprises enqueuing one or more requests and maintaining a pre-selected number of concurrent requests.

4. The system of claim 1 wherein isolating the request comprises causing the request to be isolated to be directed to a computing device having a isolation mechanism to isolate the request from the application server.

5. The system of claim 1 further comprising a plurality of application servers coupled with the regulator.

6. The system of claim 5 further comprising a plurality of regulators coupled with the plurality of application servers, wherein the plurality of regulators coordinate regulation of requests.

7. The system of claim 1 wherein the regulator determines a regulation action based on at least one filter and at least one corresponding action, wherein the at least one filter determines what class of request attributes and features to select among incoming requests and wherein the action determines what regulation action is to be performed to satisfy the at least one filter.

8. The system of claim 1 wherein the regulator utilizes real-time and historic metrics from a plurality of resource classes of the application server to identify and classify usage patterns.

9. The system of claim 1 wherein the regulator operates within a multi-tenant on-demand services environment and the regulator provides regulation of the requests based at least on organization, user, request performance traits or data source.

10. A non-transitory computer-readable medium having instructions stored thereon that, when executed, cause one or more processors to servicing requests for utilization of resources within a computing environment, the instructions comprising instructions to cause the processors to:
    receive, with a regulator agent, a request from a remote electronic computing device, the request to utilize resources of at least one computing device within the computing environment, the regulator to determine whether to regulate a request or to allow the request to be delivered without regulation, wherein regulating the request comprises causing the request to be one of rejected, re-routed, isolated and delayed based on at least one of a specific organization, user, request performance trait, and target node data source, wherein the regulator makes the determination at the application level based on a resource cost analysis and whether the request represents an anomaly with respect to requests in a request stream;
    provide, with a computing device, an application server communicatively coupled with the regulator, the computing device having resources to generate a response to the request and to cause the response to be transmitted to the remote electronic computing device;
    wherein the regulator selectively regulates the request based on application-level resources to be utilized by the application server in response to the request by analyzing the request prior to delivery to the application server, wherein the selective regulation at least routes requests to consume excessive portions of a resource class to a queue for subsequent service at a controlled rate, wherein the selective regulation further comprises filtering to select among incoming requests and an action that determines a handling behavior based on the requests that satisfies the filter predicates; wherein the regulator receives application-level feedback information from one or more application servers configured to process requests to modify subsequent request filtering based, at least in part, on the application-level feedback information.

11. The non-transitory computer-readable medium of claim 10 wherein the instructions to cause re-routing of the request comprise instructions that, when executed, cause the one or more processors to enqueue one or more requests and dispatching requests at a pre-selected rate.

12. The non-transitory computer-readable medium of claim 10 wherein the instructions to cause re-routing of the request comprise instructions that, when executed, cause the one or more processors to enqueue one or more requests and maintaining a pre-selected number of concurrent requests.

13. The non-transitory computer-readable medium of claim 10 wherein the instructions to cause isolating of the request comprise instructions that, when executed cause the one or more processors to cause the request to be isolated to be directed to a computing device having an isolation mechanism to isolate the request from the application server.

14. The non-transitory computer-readable medium of claim 10 further comprising instructions that, when executed, cause a plurality of regulators coupled with the plurality of application servers to coordinate regulation of requests.

15. The non-transitory computer-readable medium of claim 10 wherein the regulator determines a regulation action based on at least one filter and at least one corresponding action, wherein the at least one filter determines what class of request attributes and features to select among incoming requests and wherein the action determines what regulation action is to be performed to satisfy the at least one filter.

16. The non-transitory computer-readable medium of claim 10 wherein the regulator utilizes real-time and historic metrics from a plurality of resource classes of the application server to identify and classify usage patterns.

17. The non-transitory computer-readable medium of claim 10 wherein the regulator operates within a multi-tenant on-demand services environment and the regulator provides regulation of the requests based at least on organization, user, request performance traits or data source.

18. A method for servicing requests for utilization of resources within a computing environment, the method comprising:
receiving, with a regulator agent, a request from a remote electronic computing device, the request to utilize resources of at least one computing device within the computing environment, the regulator to determine whether to regulate a request or to allow the request to be delivered without regulation, wherein regulating the request comprises causing the request to be one of rejected, re-routed, isolated and delayed based on at least one of a specific organization, user, request performance trait, and target node data source, wherein the regulator makes the determination at the application level based on a resource cost analysis and whether the request represents an anomaly with respect to requests in a request stream;
providing, with a computing device, an application server communicatively coupled with the regulator, the computing device having resources to generate a response to the request and to cause the response to be transmitted to the remote electronic computing device;
wherein the regulator selectively regulates the request based on application-level resources to be utilized by the application server in response to the request by analyzing the request prior to delivery to the application server, wherein the selective regulation at least routes requests to consume excessive portions of a resource class to a queue for subsequent service at a controlled rate, wherein the selective regulation further comprises filtering to select among incoming requests and an action that determines a handling behavior based on the requests that satisfies the filter predicates;
wherein the regulator receives application-level feedback information from one or more application servers configured to process requests to modify subsequent request filtering based, at least in part, on the application-level feedback information.

19. The method of claim 18 where re-routing the request comprises enqueuing one or more requests and dispatching requests at a pre-selected rate.

20. The method of claim 18 where re-routing the request comprises enqueuing one or more requests and maintaining a pre-selected number of concurrent requests.

21. The method of claim 18 wherein isolating the request comprises causing the request to be isolated to be directed to a computing device having a isolation mechanism to isolate the request from the application server.

22. The method of claim 21 further comprising a plurality of regulators coupled with the plurality of application servers, wherein the plurality of regulators coordinate regulation of requests.

23. The method of claim 22 wherein the regulator determines a regulation action based on at least one filter and at least one corresponding action, wherein the at least one filter determines what class of request attributes and features to select among incoming requests and wherein the action determines what regulation action is to be performed to satisfy the at least one filter.

24. The method of claim 18 wherein the regulator utilizes real-time and historic metrics from a plurality of resource classes of the application server to identify and classify usage patterns.

25. The method of claim 18 wherein the regulator operates within a multi-tenant on-demand services environment and the regulator provides regulation of the requests based at least on organization, user, request performance traits or data source.

* * * * *